United States Patent Office 3,644,385

Patented Feb. 22, 1972

3,644,385

$\alpha^5$-O-ACYL-PYRIDOXAL DERIVATIVES

Isamu Utsumi, Kyoto-shi, Kyoto-fu, Toshiro Watanabe, Takatsuki-shi, Osaka-fu, Keiichi Kohno, Toyonaka-shi, Osaka-fu, Isamu Daira, Kawanishi-shi, and Akira Otsubo, Kobe-shi, Japan, assignors to Tanabe Seiyaku Co., Ltd., Osaka, Japan No Drawing. Filed Nov. 25, 1968, Ser. No. 778,793
Claims priority, application Japan, Nov. 27, 1967, 42/76,016
Int. Cl. C07d *31/34*
U.S. Cl. 260—295.5 R 3 Claims

ABSTRACT OF THE DISCLOSURE $\alpha^5$-O-acyl-pyridoxals according to the formula

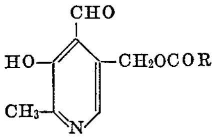

and a method of manufacture thereof by oxidation of the corresponding $\alpha^5$-O-acyl-pyridoxine using manganese compounds as oxidizing agents.

This invention relates to novel derivatives of pyridoxal. More particularly, it relates to $\alpha^5$-O-acyl-pyridoxal represented by the formula

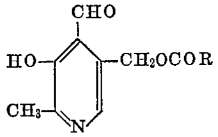

(1)

wherein R is an alkyl, phenyl or 3-pyridyl group and the process for preparing the same.

The $\alpha^5$-O-acyl-pyridoxals of the present invention are pharmacologically useful compounds which may be used in the treatment of various syndromes, for example, vitamin $B_6$ deficiency symptoms. They are particularly advantageous compared to known vitamin $B_6$ compounds, because they offer high permeability into living cells, such as erythrocytes, and prolonged retention therein. For example, as illustrated in Table 1, $\alpha^5$-O-n-butyryl-pyridoxal, $\alpha^5$ - O - isobutyryl-pyridoxal and $\alpha^5$-O-benzoyl-pyridoxal penetrate into erythrocytes 2–3 times faster than pyridoxal, and about 200 times faster than pyridoxal phosphate. Table 2 shows that the administration of the above three $\alpha^5$-O-acyl-pyridoxal compounds to rats resulted in blood, liver and brain pyridoxal levels which were higher and longer maintained than pyridoxal levels obtained after the administration of known vitamin $B_6$ compounds. Similar improved characteristics are obtained with the corresponding acetyl, n-propionyl, n-varelyl, iso-varelyl, caproyl, heptanoyl, hexanoyl, palmitoyl or nicotinoyl groups.

The remarkable durability of certain of these compounds in the living body is dramatically demonstrated by Table 3 which shows the estimation of half life of these compounds in the blood of rabbits.

TABLE 1.—PERCENTAGES OF PENETRATED VITAMIN $B_6$ COMPOUNDS INTO ERYTHROCYTE (TOTAL PYRIDOXAL)

| Compound | Ht (percent) | µg./ml. cell | Time after addition of B6 compound (min.) 1 | 2 | 4 | 6 | 30 | 60 | 120 |
|---|---|---|---|---|---|---|---|---|---|
| Pyridoxal | 13.5 | 50 | 38 | 52 | 54 | 66 | - | - | - |
| Pyridoxine | 15 | 7 | - | - | - | - | 16 | 31 | 51 |
| $\alpha^5$-O-butyryl-pyridoxine | 15 | 7 | - | - | - | - | 15 | 27 | 50 |
| Pyridoxal-$\alpha^5$-phosphate | 15 | 7 | - | - | - | - | 6 | 7 | 29 |
| $\alpha^5$-O-pyridoxal ester: | | | | | | | | | |
| Butyrate | 13.5 | 50 | 90 | 90 | 92 | 92 | - | - | - |
| Isobutyrate | 13.5 | 50 | 90 | 92 | 94 | 94 | - | - | - |
| Benzoate | 13.5 | 50 | 88 | 88 | 88 | 90 | - | - | - |

The compounds pyridoxal, pyridoxine, $\alpha^5$-O-butyryl pyridoxine, pyridoxal-$\alpha^5$-phosphate, $\alpha^5$-O-pyridoxal butyrate, $\alpha^5$-O-pyridoxal isobutyrate and $\alpha^5$-O-pyridoxal benzoate were each tested as follows: The test compound was dispered in a 0.05 M phosphate buffer solution (pH 7.4) in which erythrocytes, collected from 3 ml. of rabbit blood, were suspended. The resultant dispersion was shaken at 37° C. and the increase in pyridoxal penetration into the erythrocyte was then estimated. The results of these tests are set forth in Table 1 above, wherein Ht percent is the hematocrit value represented by volume percentage of erythrocyte in its suspension, and µg./ml. cell is that concentration of the compound represented by the equivalent amount (µg.) of pyridoxal hydrochloride in one ml. of blood cells.

TABLE 2.—TOTAL PYRIDOXAL CONCENTRATION (AND PYRIDOXAL PHOSPHATE CONCENTRATION) IN RATS, µG. PERCENT

| | Route | | | | | | | | | | | | | |
|---|---|---|---|---|---|---|---|---|---|---|---|---|---|---|
| | Intravenous | | | | | | Subcutaneous | | | | Oral | | | |
| | Blood | | Liver | | Brain | | Blood | | Liver | | Blood | | Liver | |
| Compound | Max. | After 3 hrs. | Max. | After 3 hrs. | Max. | After 3 hrs. | Max. | After 3 hrs. | Max. | After 3 hrs. | Max. | After 3 hrs. | Max. | After 3 hrs. |
| Pyridoxal | 2,945 | 213 | 878 (412) | 369 (299) | 314 (153) | 97 (97) | 2,122 | 151 | 932 (417) | 385 (337) | 985 (21) | 243 (15) | 901 (468) | 498 (374) |
| Pyridoxal phosphate | 1,789 | 359 | 836 (688) | 514 (435) | 353 (181) | 182 (109) | 2,788 | 310 | 865 (705) | 474 (421) | 1,169 (21) | 174 (12) | 1,002 (452) | 427 (333) |
| Pyridoxine | - | - | - | - | - | - | 317 | 165 | 544 (343) | 369 (278) | - | - | - | - |
| Pyridoxal ester: | | | | | | | | | | | | | | |
| Isobutyrate | 6,228 | 1,130 | 752 (407) | 605 (403) | 376 (185) | 308 (185) | - | - | - | - | - | - | - | - |
| Butyrate | - | - | - | - | - | - | 4,647 | 1,980 | 729 (520) | 704 (396) | - | - | - | - |
| Benzoate | - | - | - | - | - | - | - | - | 1,150 | 600 | 1,076 (32) | 556 (32) | 754 (471) | 638 (465) |
| Nicotinate | 50320 | 1,042 | 847 (415) | 587 (377) | 367 (182) | 274 (156) | - | - | - | - | 1,284 (37) | 574 (32) | 898 (495) | 627 (411) |

The compounds pyridoxal, pyridoxal phosphate, pyridoxine, pyridoxal isobutyrate, pyridoxal butyrate, pyridoxal benzoate and pyridoxal nicotinate were each tested as follows: The test compound was administered to rats intravenously, subcutaneously and orally, in the form of a solution adjusted to pH 7.4 with 0.1 M-phosphate-buffer, said solution containing an amount equimolar to 10 mg. of pyridoxal hydrochloride per kg. of body weight. Pyridoxal levels were estimated with time. Mean values, of three animals for each group, were tabulated. Table 2, above, sets forth these results.

TABLE 3.—HALF LIFE OF TOTAL PYRIDOXAL CONCENTRATION IN RABBIT BLOOD

| Compound | Half life (min.) | Velocity constant $\times 10^{-2}$.min.$^{-1}$ | Note |
|---|---|---|---|
| Pyridoxal | 22 | 3.0 | Decreasing under first order kinetics within an hour. |
| Pyridoxal phosphate | 28 | 2.4 | |
| Pyridoxal-$\alpha^5$-butyrate | 41 | 1.7 | Decreasing under first order kinetics within three hours. |
| Pyridoxal-$\alpha^5$-isobutyrate | 56 | 1.2 | |

The compounds pyridoxal, pyridoxal phosphate, pyridoxal-$\alpha^5$-butyrate and pyridoxal-$\alpha^5$-isobutyrate were each tested as follows: The test compound was administered intravenously to rabbits in the form of a solution adjusted to pH 7.4 with 0.1 M-phosphate buffer, said solution containing an amount equimolar to 10 mg. of pyridoxal hydrochloride per kg. of body weight, and the half life of total pyridoxal concentration in the blood (and velocity constant thereof) was calculated. Table 3, above, sets forth these results.

The compounds of the present invention are effective in relieving vitamin $B_6$ deficiency symptoms in adult human beings when administered orally in doses of about 30–100 mg./day or intravenously in doses of about 10–30 mg./day. We have found that the $\alpha^5$-O-acyl-pyridoxals are readily hydrolyzable into pyridoxal in the living body. For example, we have ascertained that 60% of the $\alpha^5$-benzoate, n-butyrate and iso-butyrate of pyridoxal (when incubated in a 5% aqueous homogenate of the intestinal tract of rats at 37° C. and at pH 7.4) is hydrolyzed into pyridoxal within 30 minutes. (A one ml. solution containing an amount of pyridoxal ester equimolar to 20 μg. of pyridoxal hydrochloride was mixed with one ml. of 5% intestinal homogenate.) The n-butyrate of pyridoxal hydrolyzed rapidly under these conditions with 80% of the ester being converted into pyridoxal within 30 minutes.

Rapid in vivo absorption of $\alpha^5$-O-acyl-pyridoxal and conversion into pyridoxal in the living body was also experimentally demonstrated after, for example, the oral administration of $\alpha^5$-O-benzoyl-pyridoxal to rats. In said experiment, an amount of $\alpha^5$-O-benzoyl-pyridoxal equimolar to 10 mg. of pyridoxal hydrochloride/kg. was administered orally to rats and the concentrations of total pyridoxal, pyridoxal phosphate and unchanged $\alpha^5$-O-benzoyl-pyridoxal in blood and liver were assayed respectively. The results obtained are set forth in Table 4, below, in which concentrations are shown in μg. percent calculated as pyridoxal hydrochloride. The mean value of three animals is listed for each group.

TABLE 4

| | Before administration | Time after administration (min.) | | | |
|---|---|---|---|---|---|
| | | 15 | 30 | 60 | 120 |
| Blood: | | | | | |
| Total pyridoxal | 16 | 219 | 810 | 903 | 637 |
| Pyridoxal phosphate | 8 | 21 | 28 | 31 | 33 |
| Pyridoxal benzoate | | 57 | 78 | 40 | 20 |
| Liver: | | | | | |
| Total pyridoxal | 476 | 641 | 815 | 629 | 614 |
| Pyridoxal phosphate | 460 | 550 | 615 | 429 | 478 |
| Pyridoxal benzoate | | 0 | 0 | 0 | 0 |

According to the present invention, the $\alpha^5$-O-acyl-pyridoxal (1) can be prepared by oxidizing the corresponding $\alpha^5$-O-acyl-pyridoxine.

Although various oxidizing agents are employable for this purpose, manganese compounds such as manganese dioxide or manganese sulfate are preferred. It is also preferable to activate the manganese compound by heating it at about 220–250° C. for several hours prior to its use in the oxidation reaction. As the reaction solvent, an inert solvent, which does not react with the oxidizing agent, such as chloroform, methylene chloride, etc. may be employed. The reaction may be carried out at room temperature. However, since this greatly prolongs the reaction time, it is preferred to carry out the reaction at an elevated temperature.

Examples of the starting $\alpha^5$-O-acyl-pyridoxine are the compounds in which said acyl group (—COR) is a lower aliphatic acyl group such as acetyl, n-propionyl, n-butyryl, iso-butyryl, n-varelyl, iso-varelyl, caproyl, heptanoyl, hexanoyl, palmitoyl, benzoyl or nicotinoyl group. The method of preparing $\alpha^5$-O-acyl-pyridoxal from $\alpha^5$-O-acyl-pyridoxine is illustrated in the following examples. However, it should be understood that these examples are given merely by way of explanation, not of limitation, and that numerous changes may be made in the details without departing from the spirit and the scope of the invention as hereinafter claimed.

EXAMPLE 1

Preparation of the starting compound 2.1 g. of $\alpha^4$,3-O-isopropylidene-pyridoxine was dissolved in 15 ml. of absolute pyridine and 1.1 g. of n-butyryl chloride was added to said solution. The mixture was stirred at 80° C. for 4 hours and then evaporated to dryness, under reduced pressure, on a water bath. 20 ml. of water was added to the residue. The resultant aqueous mixture was neutralized with sodium bicarbonate and extracted with chloroform. The chloroform layer was washed with water. The chloroform extract was then evaporated to remove the solvent and the resultant residue was dissolved in a small quantity of methanol. The methanol solution was decolorized and evaporated to remove the methanol. 60 ml. of 9% aqueous solution of formic acid was then added to the remaining oil. This mixture was heated for 30 minutes at 80° C. and concentrated under reduced pressure. The remaining yellow oily substance was adsorbed on silica gel and developed with a mixed solvent of chloroform and ethanol (15:1) whereby 1.2 g. of $\alpha^5$-O-n-butyryl-pyridoxine melting at 96–98° C. was obtained as a colorless crystalline powder. This represented a yield of 50% of theoretical. The infrared absorption of this compound was found to be 1737 cm.$^{-1}$ (esteric carbonyl).

*Analysis*.—Calculated for $C_{12}H_{17}NO_4$ (percent): C, 60.24; H, 7.16; N, 5.85. Found (percent): C, 60.13; H, 7.20; N, 5.80.

Preparation of $\alpha^5$-O-n-butyryl-pyridoxal 1.2 g. of $\alpha^5$-O-n-butyryl-pyridoxine, 2.4 g. of manganese dioxide and 80 ml. of chloroform were admixed and the mixture was stirred, at room temperature, for 24 hours. The mixture was then filtered and the collected insoluble filtrate was washed with chloroform. The filtrate and the washings were incorporated and evaporated to remove chloroform. The remaining oily substance was permitted to stand until crystallization took place, whereby a quantitative amount of $\alpha^5$-O-n-butyryl-pyridoxal, melting at 45–46° C., was obtained.

*Analysis*.—Calculated for $C_{12}H_{15}NO_4$ (percent): C, 60.75; H, 6.37; N, 5.90. Found (percent): C, 60.51; H, 6.55; N, 5.73.

EXAMPLE 2

2.4 g. of $\alpha^5$-O-isobutyryl-pyridoxine was prepared and oxidized, as described in Example 1. 2.1 g. of $\alpha^5$-O-iso-butyryl-pyridoxal, melting at 48–49° C. (after recrystallization from petroleum ether), were obtained as slightly yellowish plates.

*Analysis.*—Calculated for $C_{12}H_{15}NO_4$ (percent): C, 60.75; H, 6.37; N, 5.90. Found (percent): C, 60.70; H, 6.39; N, 5.75.

EXAMPLE 3

150 mg. of $\alpha^5$-O-palmitoyl-pyridoxine and 300 mg. of activated manganese dioxide were suspended in 50 ml. of chloroform and the mixture was stirred at room temperature for 48 hours. The reaction mixture was filtered and the filtrate was concentrated. The resultant residue was recrystallized from a mixture of petroleum ether and ether whereby 125 mg. of $\alpha^5$-O-palmitoyl-pyridoxal were obtained as colorless scales melting at 70–72° C.

*Analysis.*—Calculated for $C_{24}H_{39}O_4N$ (percent): C, 71.07; H, 9.69; N, 3.45. Found (percent): C, 71.02; H, 9.73; N, 3.52.

EXAMPLE 4

2.7 g. of $\alpha^5$-O-benzoyl-pyridoxine was prepared and oxidized, as described in Example 1. 2.5 g. of $\alpha^5$-O-benzoyl-pyridoxal, melting at 112–113° C., were obtained.

*Analysis.*—Calculated for $C_{15}H_{13}NO_4$ (percent): C, 66.41; H, 4.83; N, 5.16. Found (percent): C, 66.38; H, 4.90; N, 5.23.

EXAMPLE 5

2.7 g. of $\alpha^5$-O-nicotinoyl-pyridoxine, prepared as described in Example 1, was suspended in 40 ml. of chloroform. 4.7 g. of manganese dioxide was added to the suspension and the mixture was stirred for 48 hours. The mixture was filtered and the insoluble filtrate was washed with chloroform. The filtrate and the washings were incorporated and evaporated to remove chloroform. The residue was dissolved in acetone and petroleum ether was added to the solution, whereby a quantitative amount of $\alpha^5$-O-nicotinoyl-pyridoxal melting at 142.2–143° C. was obtained as slightly yellowish needles.

*Analysis.*—Calculated for $C_{14}H_{12}O_2N_4$ (percent): C, 61.76; H, 4.44; N, 10.29. Found (percent): C, 61.53; H, 4.67; N, 10.41.

What we claim is:

1. Pyridoxal-$\alpha^5$-n-butyrate.

2. Pyridoxal-$\alpha^5$-isobutyrate.

3. Pyridoxal-$\alpha^5$-benzoate.

References Cited

UNITED STATES PATENTS 2,955,115 10/1960 Kammerow et al. ---- 260—297

OTHER REFERENCES

Kuroda et al.: Chem. Abstracts, vol. 66, No. 17, item No. 75890m, Apr. 24, 1967.

ALAN L. ROTMAN, Primary Examiner

U.S. Cl. X.R.

260—297 V, 297.5; 424—263, 266